(12) United States Patent
Amdur et al.

(10) Patent No.: US 7,234,060 B1
(45) Date of Patent: Jun. 19, 2007

(54) GENERATION AND USE OF DIGITAL SIGNATURES

(76) Inventors: Eugene Amdur, 135 George Street South, #704, Toronto, Ontario (CA) M4A 4EA; Irving Reid, 152 St. Patrick Street, #610, Toronto, Ontario (CA) M5T 3J9; C. Harald Koch, 53 Treverton Drive, Scarborough, Ontario (CA) M1K 3S5; Steven Lamb, 15 Ballacaine Drive, Toronto, Ontario (CA) M8Y 4A7

( * ) Notice: Subject to any disclaimer, the term of this patent is extended or adjusted under 35 U.S.C. 154(b) by 1389 days.

(21) Appl. No.: 09/614,487

(22) Filed: Jul. 11, 2000

(51) Int. Cl.
*G06F 17/00* (2006.01)

(52) U.S. Cl. .................... 713/176; 713/168; 713/180

(58) Field of Classification Search ............... 713/168, 713/176, 180, 200, 201
See application file for complete search history.

(56) References Cited

U.S. PATENT DOCUMENTS

| | | | |
|---|---|---|---|
| 6,049,878 A | | 4/2000 | Caronni et al. |
| 6,606,708 B1 * | | 8/2003 | Devine et al. ............... 713/201 |

FOREIGN PATENT DOCUMENTS

JP     1198134 A  *  4/1999

OTHER PUBLICATIONS

Bruce Schneier, 1996, Katherine Schowalter, "Applied Cryptography".*
Bruce Schneier, 1996, John Wiley & Sons, Inc., "Applied Cryptography", pp. 178-187.*
Novel applications of cryptography in digital communications; Omura, J.K.; Communications Magazine, IEEE vol. 28, Issue 5, May 1990 pp. 21-29.*
Key management for large scale end-to-end encryption; Witzke et al.; Security Technology, Proceedings. IEEE 28th Annual 1994 International Carnahan Conference on Oct. 12-14, 1994 pp. 76-79.*
Certificate path generating protocol (CPGP) for authenticated signaling in ATM networks; Jun Xu; Singhal, M.; Network Protocols, 1998. Proceedings. Sixth International Conference on Oct. 13-16, 1998, pp. 282-289.*
Park, J. S., and Sandhu, R.: "Secure cookies on the Web," IEEE Internet Computing, Jul.-Aug. 2000, pp. 36-44, XP002190888 pp. 39-41, "Providing Integrity," Figures 3.4.
Park, J. S., "Secure Attribute Services on the Web," Jun. 1999, Dissertation, George Mason University, Fairfax, VA., XP002190891.
Antonomasia (ant@notatla.demon.co.uk) Internet Newsgroup: "Volatile Shared Memory (For Linux 2.2)" 'Online!' Jan. 4, 2000, XP002190889, Newsgroups:jyu.ohjelmointi.coderpunks. Retrieved from the Internet: URL: http://groups.google.com/>.

(Continued)

*Primary Examiner*—David Jung

(57) ABSTRACT

A digital signature is generated in association with target data. The computer generating the digital data encrypts the digital signature using a public key encryption system. The private key is stored in dynamic memory in a secure manner. The public key associated with the private key is stored in an accessible database. The public key is accessed from the database and used by recipient computers to authenticate the target data by decrypting the encrypted digital signature. When the computer generating the digital signature is restarted, the private key stored in dynamic memory is lost. The computer obtains a new private and public key pair from the public key encryption system. The previously used public key is maintained in the database until a predefined time has elapsed, after which it is removed from the database.

6 Claims, 2 Drawing Sheets

OTHER PUBLICATIONS

Gutmann, Peter: "Secure Deletion of Data from Magnetic and Solid-State Memory," Sixth USENIX Security Symposium, 'Online!'Jul. 22-23. 1996, XP002190890, San Jose, CA.

Stallings, W.: "Cryptography and Network Security: Principles and Practice—2nd," 1998. Prentice Hall. XP002190892, Chapter 6.

* cited by examiner

GENERATION AND USE OF DIGITAL SIGNATURES

FIELD OF THE INVENTION

The present invention is directed to an improvement in computing systems and in particular to an improvement in generating and using digital signatures for digital data.

BACKGROUND OF THE INVENTION

Where the trustworthiness of digital data is important, it is known to use digital signatures to permit authentication of the digital data. When data is transferred from a sender to a recipient, the prior art provides a mechanism for the recipient to confirm that the received data is the same as the data as it was sent. A known technique is for the sender to compute a digest of the data before it is sent. The digest, and potentially other identifying data, makes up a digital signature. The digest is encrypted using a private key generated using a public key encryption standard (for example, the RSA encryption standard) and is attached to the sent data. A party seeking to authenticate the data is able to decrypt the digital signature (the data digest) using the public portion of the public-private encryption key pair. The recipient is able to compare the decrypted digest with the data received. If the decrypted digest conforms to the data actually received then the recipient of the data has an assurance that the data is the same as what was sent.

Due to the properties of the public-private pair of keys in the public encryption standard, the recipient can be assured that the digest of the data was generated by the party having access to the private key, only. In this way, the party using the data can ensure that the data has not been tampered with after the digest was encrypted by the party holding the private key.

In such a system the sender will make available the public key portion of the public-private key pair generated by the public key encryption system. This public key will permit any user having access to the public key to decrypt the digital signature which has been generated by the use of the associated private key.

Typically, in systems such as that described above, a given public-private key pair will be valid for a certain period of time, following which a new public-private key pair is generated. To ensure that the public key remains useful during the stipulated time period, it is known to save, in a secure manner, the private key, to ensure that if the system generating data is restarted for any reason, the private key will be available for use digitally after the system is restarted.

As will be apparent, the security of this system is compromised where the private key is not securely stored. In the prior art different approaches are used, including the use of smart cards for the storage of private keys, to keep the private keys secure.

Such approaches, however, either make the private keys potentially vulnerable to breaches of security or incorporate potentially expensive and complex security mechanisms to maintain the private key in a secure manner.

It is therefore desirable to have a digital signature system in which the private key may be maintained in a secure manner without requiring complex security mechanisms.

SUMMARY OF THE INVENTION

According to one aspect of the present invention, there is provided improved generation and use of digital signatures.

According to another aspect of the invention there is provided a computer program product for use with a data forwarding computer, the computer program product including a computer usable medium having computer readable program code means embodied in the medium for generating an encrypted digital signature for authentication of target data by one or more of a set of recipient computers, the computer program product including computer readable program code means for causing the data forwarding computer to:

request a private key and an associated public key from a public key encryption system, maintain the private key in the dynamic memory of the data forwarding computer, maintain the public key in a database available to the set of recipient computers, generate a digital signature for the target data, encrypt the digital signature using the public key encryption system and the private key, and forward the target data and the encrypted digital signature to one or more of the set of recipient computers, whereby each of the set of recipient computers is permitted to access the public key in the database to enable the decryption of the encrypted digital signature using the public key encryption system for authentication of the target data.

According to another aspect of the invention there is provided the above computer program product that includes computer readable program code restart means for causing the data forwarding computer to request a replacement private key and an associated replacement public key, the replacement private key being maintained in the dynamic memory of the data forwarding computer and the replacement public key being maintained in the database by the data forwarding computer, the restart means being invoked on a restart of the data forwarding computer.

According to another aspect of the invention there is provided the above computer program product that includes: computer readable program code means for causing the data forwarding computer to determine an elapsed time, and computer readable program code means for causing the data forwarding computer to purge each public key in the database that has been maintained in the database for longer than the elapsed time.

According to another aspect of the invention there is provided the above computer program product that includes: computer readable program code means for causing the data forwarding computer to obtain a unique identifier, and computer readable program code means for causing the data forwarding computer to associate the unique identifier with the target data and to forward the unique identifier with the target data.

According to another aspect of the invention there is provided the above computer program product that includes: computer readable program code means for causing the data forwarding computer to maintain the unique identifier with each public key stored in the database, whereby one of the set of recipient computers is enabled to retrieve one or more public keys from the database by specifying the unique identifier.

According to another aspect of the invention there is provided a method for generating an encrypted digital signature by a data forwarding computer, for authentication of target data by one or more of a set of recipient computers, method comprising:

the data forwarding computer:
requesting a private key and an associated public key from a public key encryption system,
maintaining the private key in the dynamic memory of the data forwarding computer,
maintaining the public key in a database available to the set of recipient computers,
generating a digital signature for the target data,
encrypting the digital signature using the public key encryption system and the private key, and
forwarding the target data and the encrypted digital signature to one or more of the set of recipient computers, and each of the set of recipient computers receiving the target data accessing the public key in the database and decrypting the encrypted digital signature using the public key encryption system to authenticate the target data.

According to another aspect of the invention there is provided a computer program product for use with a client-server computer network, the network comprising a set of server computers and a set of client computers, the computer program product including a computer usable medium having computer readable program code means embodied in the medium for providing authentication of cookies, the computer program product including:

computer readable program code means for enabling a first one of the set of client computers communicating with a first one of the set of server computers to provide identifying data to the first one of the set of server computers, computer readable program code means for enabling the first one of the set of server computers to request a private key and an associated public key from a public key encryption system, computer readable program code means for causing the first one of the set of server computers to maintain the private key in a dynamic memory device, computer readable program code means for causing the first one of the set of server computers to maintain the public key in a database available to the set of server computers, computer readable program code means for enabling the first one of the set of server computers to generate a cookie for the first one of the set of client computers, the cookie comprising data corresponding to the identifying data provided by the first one of the set of client computers, computer readable program code means for causing the first one of the set of server computers to generate a digital signature for the cookie, computer readable program code means for causing the first one of the set of server computers to encrypt the digital signature using the public key encryption system and the private key, computer readable program code means for enabling the first one of the set of server computers to forward the cookie and the associated encrypted digital signature to the first one of the set of client computers, computer readable program code means for enabling the first one of the set of client computers to communicate with a second one of the set of server computers, and in response, the second one of the set of server computers to request and receive the cookie and the encrypted digital signature from the first one of the set of client computers, computer readable program code means for causing the second one of the set of server computers to retrieve the public key for the encrypted digital signature from the database and to decrypt the digital signature using the public key encryption system and the retrieved public key, and computer readable program code means for enabling the second one of the set of server computers to use the decrypted digital signature to authenticate the cookie received from the first one of the set of client computers.

According to another aspect of the invention there is provided a method for providing authentication of cookies in a client-server computer network, the network having a set of server computers and a set of client computers, the method including the following steps:

a first one of the set of client computers communicating with a first one of the set of server computers, the first one of the set of client computers providing identifying data to the first one of the set of server computers, the first one of the set of server computers requesting a private key and an associated public key from a public key encryption system, the first one of the set of server computers maintaining the private key in a dynamic memory device, the first one of the set of server computers maintaining the public key in a database available to the set of server computers, the first one of the set of server computers generating a cookie for the first one of the set of client computers, the cookie comprising data corresponding to the identifying data provided by the first one of the set of client computers, the first one of the set of server computers generating a digital signature for the cookie, the first one of the set of server computers encrypting the digital signature using the public key encryption system and the private key, the first one of the set of server computers forwarding the cookie and the associated encrypted digital signature to the first one of the set of client computers, the first one of the set of client computers communicating with a second one of the set of server computers, and in response, the second one of the set of server computers requesting and receiving the cookie and the encrypted digital signature from the first one of the set of client computers, the second one of the set of server computers retrieving the public key for the encrypted digital signature from the database and decrypting the digital signature using the public key encryption system and the retrieved public key, the second one of the set of server computers using the decrypted digital signature to authenticate the cookie received from the first one of the set of client computers.

Advantages of the present invention include a computer system in which the generation and use of digital signatures relies on a public key encryption system where, according to the current invention, it is not necessary to maintain a private key outside the RAM memory of a computer.

BRIEF DESCRIPTION OF THE DRAWINGS

The preferred embodiment of the invention is shown in the drawings, wherein.

Figure 1:
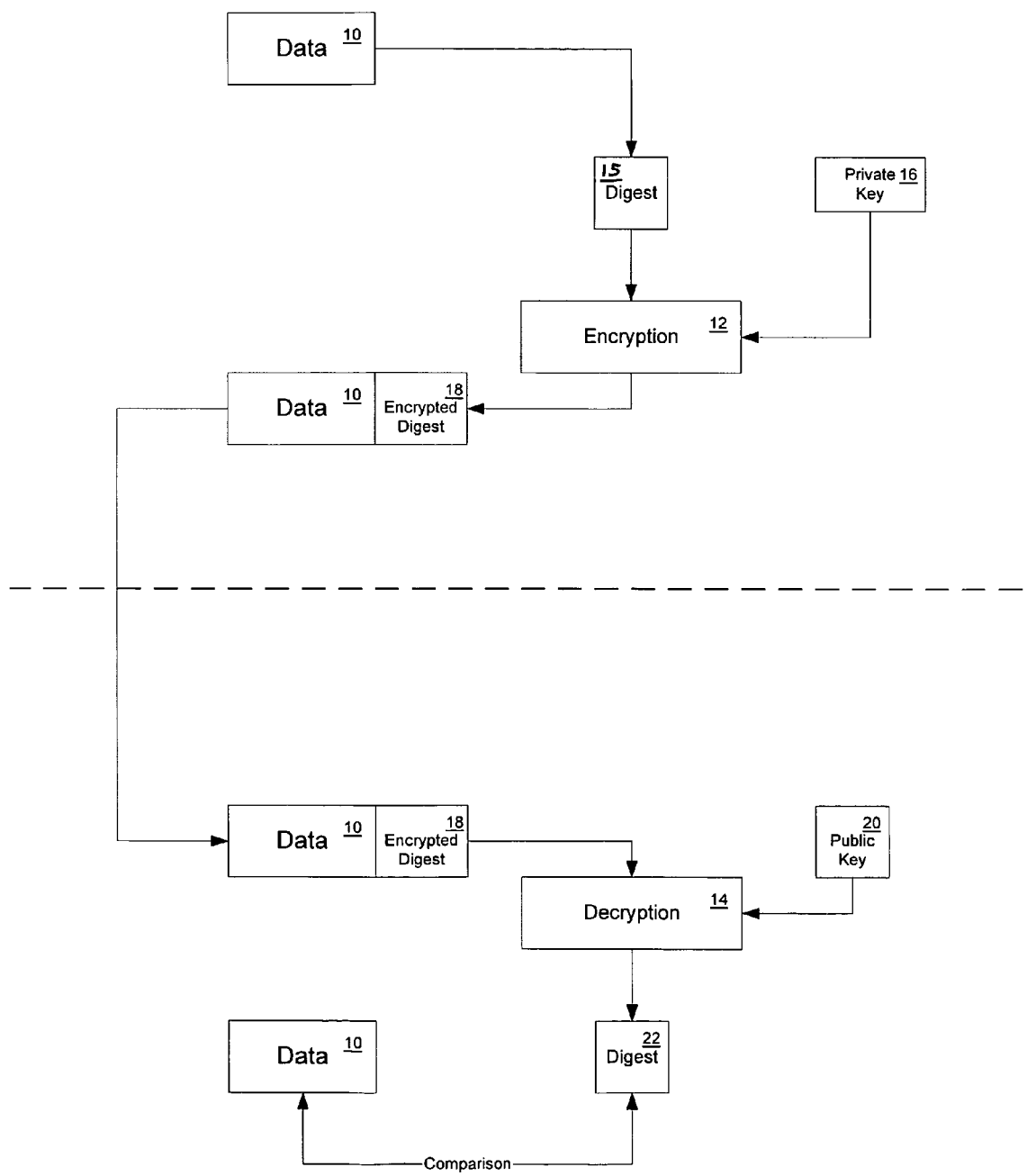
FIG. 1 is a schematic diagram showing the prior art method for creating and using a digital signature.

In the drawings, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

FIG. 1 is a schematic diagram illustrating the generation and use of digital signatures using a public key system, according to the prior art. FIG. 1 shows set of data 10, encryption mechanism 12 and decryption mechanism 14. The encryption and decryption in FIG. 1 are based on a public key encryption system. It will be appreciated by those skilled in the art that the encryption mechanism 12 and decryption mechanism 14 may be the same application made available to both the party encrypting and the party decrypting, or may be different copies of the application resident on different computers. The party creating the digital signature (the sender), will create a digest 15 based on data 10. A private key 16 is used by encryption mechanism 12 to create encrypted digest 18. Data 10 and encrypted digest 18 are then sent to a recipient. In FIG. 1, the portion of the schematic diagram above the dashed line represents the sender side of the system and the portion below the dash line represents the recipient side of the system.

As will be apparent to those skilled in the art, a sender and a recipient may be remote computers, may be different computers on the same local network, or may be different processes running on the same computer. Although the description of the preferred embodiment refers to senders and recipients, it will be apparent to those skilled in the art that the invention will be implemented in different applications where data is created and then later read and the trustworthiness of the data is important. For example, the data may be stored in a memory location rather than transferred between computers. As the preferred embodiment lends itself to distributed applications, the description refers to the transfer of data from a sender to a recipient.

At the recipient side, decryption mechanism 14 uses public key 20 to decrypt encrypted digest 18 to create digest 22. The data in digest 22 will be identical to the data in digest 15 if there has been no change to the digests during the transfer of the data. Public key 20 is part of the public/private key pair generated by the sender and corresponds to private key 16. The recipient is able to compare digest 22 to data 10 and if the digest and the data match there is an assurance that the data has been received in an unaltered state.

Figure 2:
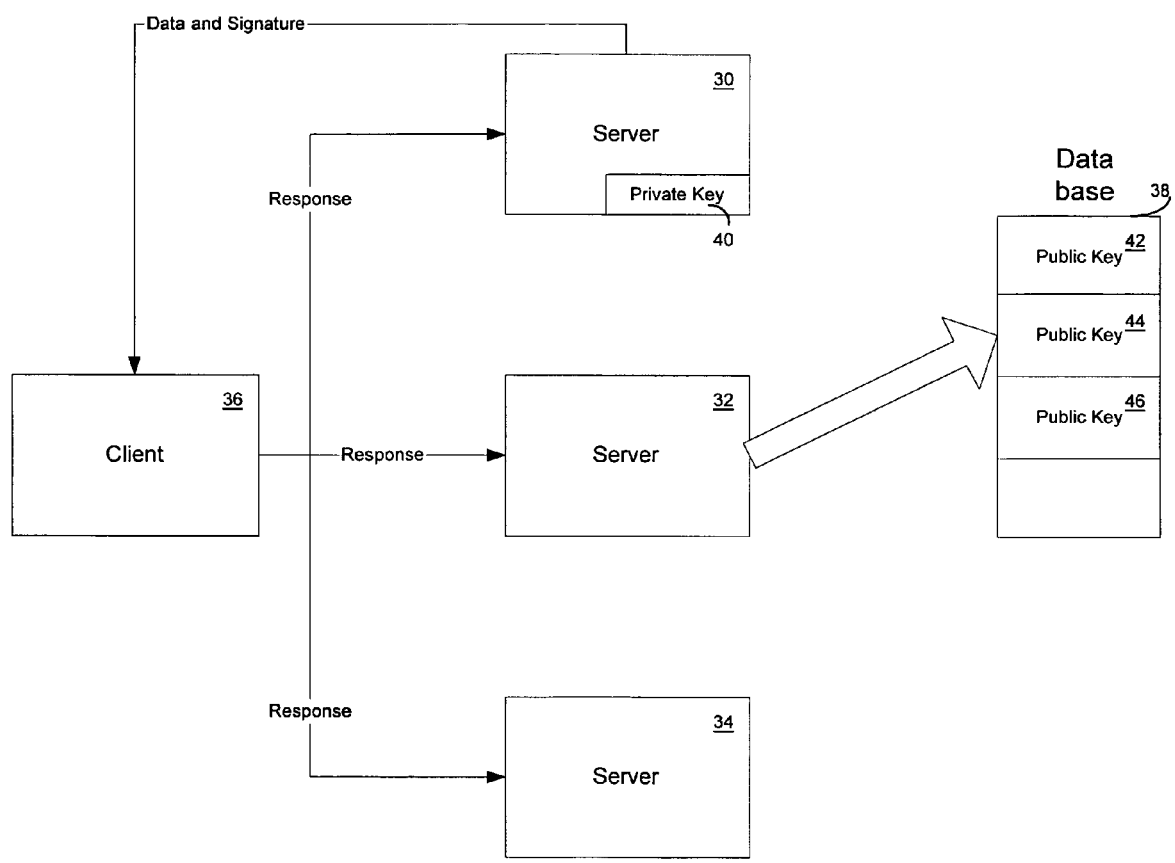
FIG. 2 is a block diagram illustrating the architecture of the preferred embodiment of the invention.

FIG. 2 shows an example illustrating the architecture of the preferred embodiment of the invention in a block diagram form. In the example of the preferred embodiment shown in FIG. 2, the system is implemented in a client server environment in which the server side of the system is distributed over three servers 30, 32, 34. Representative client 36 is shown, as well as database 38. An application of the preferred embodiment is the digital signature applied to "cookies" typically used in the client server internet environment. A cookie is a set of data used to identify a particular browser to a server or set of servers. The server will pass identification data to the user (or browser) in the form of a digitally signed cookie and subsequent queries to the web server (in the example of FIG. 2 any one of servers 30, 32, 34) include the cookie. The cookie is used to communicate information about the user or browser to the web server. It is typical for a web server to store a user's authenticated identity in a cookie. To prevent such a cookie from being forged, duplicated or used by unauthorized users, the server incorporates a digital signature in the cookie.

It is known in the art to use a public key encryption system to ensure that the digital signature is secure. Such public key systems are well known to those in the art and include such standards as the RSA standard and the DSS standard. As will be understood by those skilled in the art, the preferred embodiment above may be implemented using an appropriate known public key encryption system. As described with reference to FIG. 1, to digitally sign data in the form of a cookie, a digest of the data, typically a hash function generated based on the data in the cookie, is generated and the data digest is then encrypted.

For example, server 30 in FIG. 2 generates a cookie for client 36. The cookie identifies client 36 to servers 30, 32, 34. In generating the cookie, server 30 uses information obtained from client 36 and adds a digital signature. To do so, server 30 creates a data digest for the cookie and obtains a private-public key pair pre-generated using a public key encryption system. The private part of the key pair used is often stored on disk (and password protected) or on a smartcard. Using the private key, server 30 encrypts the data digest for the cookie. The cookie, with digital signature included, is sent to client 36 by server 30. When client 36 sends a query to web server 30, server 30 will access the cookie for client 36 (including the encrypted digital signature). Server 30 will use the public key (associated with the private key) to decrypt the data digest and compare the data digest data with the cookie data to confirm that the cookie was unmodified from what had been originally sent by server 30.

This prior art approach to digital signatures is useful in the context of the example shown in FIG. 2, as well as other contexts where digital data is signed using a digital signature. As will be apparent, the security of the system depends on the security of the private key used by server 30. Typically, such a private key will be stored in a secure fashion on a disk associated with server 30, or in some other secure fashion, such as on a smart card.

In the system of the preferred embodiment, the private key used in generating the digital signature is not stored in a location external to the server. Rather, the private key in FIG. 2 is maintained in the dynamic memory of server 30 (shown as private key 40 in FIG. 2). The system of the preferred embodiment also includes database 38 which is shown in the example of FIG. 2 as storing currently active public keys 42, 44, 46.

The system of the preferred embodiment functions by server 30 generating data (in the example above, the cookie data) and including with the data an identifier identifying the server. A public key encryption system is used to encrypt a digital signature as in the prior art. However, private key 40 is maintained in dynamic memory in server 30, only. This provides for increased security for the private key. The associated public key is stored in database 38. In the example of FIG. 2, private key 40 in dynamic memory of server 30 has an associated public key 44 that is stored in database 38, which is accessible to other servers 32, 34 as well as server 30.

The decryption of the digital signature proceeds in the same manner as described above with respect to the prior art. When client 36 sends the cookie (the data and encrypted digital signature) to the server, the distributed server architecture shown in FIG. 2 results in the cookie (the response as shown in FIG. 2) being forwarded to any one of servers 30, 32, 34. In the example illustrated in FIG. 2, the cookie is received by server 32 which accesses database 38 to retrieve public key 44. Server 32 is able to identify public key 44 by the fact that server 30 included in the cookie sent to client 36 an identifier indicating that the cookie originated from server 30.

In the preferred embodiment, database 38 stores each of public keys 42, 44, 46 in association with an identifier indicating the server that generated the public key. This permits server 32 to locate, for example, public key 44 which corresponds to private key 40 by locating a public key in database 38 generated by server 30. Server 32 uses public key 44 to decrypt the digital signature in the cookie, and compare the decrypted data digest with the cookie data to determine whether the cookie is an authentic cookie, originally sent by server 30.

In the preferred embodiment database 38 is intended to store multiple public keys from each of servers 30, 32, 34. In the system of the preferred embodiment, when a server is restarted, the private key previously stored in dynamic memory is no longer available to the server. However, the public key matching the now unavailable private key is maintained in database 38. On restarting a server, the server will generate a new public-private key pair. The private key is maintained in the dynamic memory of the server, as described above. The new public key is then added to the list of public keys maintained in database 38. As will be apparent to those skilled in the art, database 38 may be distributed rather than a single database. The recipients of the data seeking to authenticate the data must be able to access the public key for the data and database 38 may have any implementation suitable to achieve this function.

When a digital signature is decrypted by one of servers 30, 32, 34, the server will access the set of public keys stored in database 38 for the server that has been identified in the data package to which the digital signature is attached. If the decryption is not successful with one of the stored public keys, the server selects another of that server's public keys found in the set stored in database 38 (if another one exists).

In this manner, the digital signature for the data may be decrypted given the public keys maintained in the database, while the private key used by the server is maintained only in the dynamic memory. As the dynamic memory is potentially more secure than disk memory, the preferred embodiment provides increased security for digital signatures.

To increase security, it is typical for digital signature systems to require changes to the public private key pairs used for digital signatures, after a particular time has elapsed.

The encryption keys are therefore replaced after a fixed length of time. In the terms of the example shown in FIG. 2, a cookie will become invalid once a predetermined time expires. In the system of the preferred embodiment, the time-lapse mechanism may be implemented by the appropriate public key being simply removed from database 38. If a public key is not located in database 38 that successfully decrypts the digital signature, the associated cookie will not be used to identify client 36 and client 36 will be required to repeat a log-in or identification procedure to gain access to the server represented by servers 30, 32, 34 so as to carry out this time period constraint.

The above approach to digital signatures permits the private key for the signature to be securely stored while ensuring that recipients seeking to access the digital signature will have access to the public key by accessing a database of present and past public keys.

Although a preferred embodiment of the present invention has been described here in detail, it will be appreciated by those skilled in the art, that variations may be made thereto. Such variations may be made without departing from the spirit of the invention or the scope of the appended claims.

We claim:

1. A computer program product for use with a client-server computer network, the network comprising a set of server computers and a set of client computers, said computer program product comprising a computer usable medium having computer readable program code embodied in said medium for providing authentication of cookies, said computer program product comprising:
   a. computer readable program code operative to enable one or more of the set of client computers to provide client-identifying data to one or more of the set of server computers,
   b. computer readable program code operative to provide a unique server-identifier for each one of the set of server computers,
   c. computer readable program code operative to enable each one of the set of server computers to request a private key and an associated public key from a public key encryption system,
   d. computer readable program code operative to enable each one of the set of server computers to store the requested private key in a dynamic memory device on the server computer, only,
   e. computer readable program code operative to enable each one of the set of server computers to store the requested public key in a database available to the set of server computers, and to associate the stored public key requested by the server computer with the unique server-identifier for the server computer,
   f. computer readable program code operative to enable each one of the set of server computers to generate cookies for one or more of the set of client computers, each generated cookie comprising data corresponding to the client-identifying data provided by the one or more of the set of client computers and comprising the value of the server-identifier assigned to the generating server,
   g. computer readable program code operative to enable each one of the set of server computers to generate an encrypted digital signature for each generated cookie using the requested private key stored in dynamic memory on the server computer,
   h. computer readable program code operative to enable each one of the set of server computers to forward cookies and their associated encrypted digital signatures to the client computers corresponding to the identifying data provided,
   i. computer readable program code operative to enable each one of the set of server computers to receive cookies with encrypted digital signatures from one or more of the set of client computers, and
   j. computer readable program code operative to enable each one of the set of server computers to extract server-identifying data from received cookies to retrieve associated public keys from the database for use in decrypting digital signatures for received cookies and thereby to authenticate the said cookies.

2. The computer program product of claim 1, further comprising:

computer readable program code responsive to the restart of a one of the server computers and operative to request a replacement private key and an associated replacement public key, computer readable program code operative to cause the replacement private key to be stored in the dynamic memory of the server computer, and computer readable program code operative to cause the replacement public key to be stored in the database.

3. The computer program product of claim 2, further comprising computer readable program code operative to cause the deletion of public keys in the database where such keys have been stored for longer than a predetermined elapsed time.

4. A method for providing authentication of cookies in a client-server computer network, the network comprising a set of server computers and a set of client computers, each one of the set of server computers having a unique server-identifier, the method comprising the following steps:

a. a first one of the set of client computers providing client-identifying data to a first one of the set of server computers, b. the first one of the set of server computers requesting a private key and an associated public key from a public key encryption system, c. the first one of the set of server computers storing the requested private key in a dynamic memory device on the first server computer, only, d. the first one of the set of server computers causing the requested public key to be stored in a database available to each one of the set of server computers, and to associate the stored public key with the unique server-identifier for the first one of the set of server computers, e. the first one of the set of server computers generating a cookie for the first one of the set of client computers, the cookie comprising data corresponding to the client-identifying data provided by the first one of the set of client computers, and comprising the value of the server-identifier for the first one of the set of server computers, f. the first one of the set of server computers generating an encrypted digital signature for the cookie using the private key stored in dynamic memory of the first one of the set of server computers, g. the first one of the set of server computers forwarding the cookie including the associated encrypted digital signature to the first one of the set of client computers, h. the first one of the set of client computers communicating with a second one of the set of server computers, and in response, the second one of the set of server computers requesting and receiving the cookie including the encrypted digital signature from the first one of the set of client computers, i. the second one of the set of server computers extracting server-identifying data from the received cookie to retrieve the associated public key for the encrypted digital signature from the database for use in decrypting the digital signature for the received cookie and thereby authenticating the cookie.

5. The method of claim 4 comprising the further steps of:

the first one of the set of server computers requesting a replacement private key and an associated replacement public key in response to a restart, storing the replacement private key in the dynamic memory of the server computer, and storing the replacement public key in the database.

6. The method of claim 4 comprising the further step of deleting public keys in the database where such keys have been stored for longer than a predetermined elapsed time.

* * * * *